(12) United States Patent
Mulligan et al.

(10) Patent No.: US 9,986,019 B2
(45) Date of Patent: May 29, 2018

(54) INTELLIGENT ROUTE MANAGEMENT FOR DIVERSE ECOSYSTEMS

(71) Applicant: AT&T INTELLECTUAL PROPERTY I, L.P., Atlanta, GA (US)

(72) Inventors: John T. Mulligan, Brick, NJ (US); Randall G. Davis, Fairview, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 240 days.

(21) Appl. No.: 14/749,085

(22) Filed: Jun. 24, 2015

(65) Prior Publication Data

US 2016/0380828 A1    Dec. 29, 2016

(51) Int. Cl.
*H04L 29/08*    (2006.01)
*H04L 29/12*    (2006.01)

(52) U.S. Cl.
CPC .......... *H04L 67/10* (2013.01); *H04L 61/2514* (2013.01); *H04L 61/6068* (2013.01)

(58) Field of Classification Search
CPC ..................................................... H04L 67/10
USPC ......... 709/223; 370/395.5, 395.52, 392, 401, 370/223, 203
See application file for complete search history.

(56) References Cited

U.S. PATENT DOCUMENTS

| | | |
|---|---|---|
| 5,790,548 A | 8/1998 | Sistanizadeh et al. |
| 6,088,443 A | 7/2000 | Darland et al. |
| 7,092,389 B2 | 4/2006 | Derleth et al. |
| 7,120,150 B2 | 10/2006 | Chase et al. |
| 7,130,393 B2 | 10/2006 | Hall et al. |
| 7,313,605 B2 | 12/2007 | Iloglu et al. |
| 7,447,151 B2 | 11/2008 | McDysan |
| 7,467,227 B1 | 12/2008 | Nguyen et al. |
| 7,706,401 B2 | 4/2010 | Bae et al. |
| 7,769,006 B1 | 8/2010 | Chase et al. |
| 7,916,735 B2 | 3/2011 | Mulligan et al. |
| 7,920,549 B2 | 4/2011 | Alt et al. |

(Continued)

*Primary Examiner* — Thuong Nguyen
(74) *Attorney, Agent, or Firm* — Greenblum & Bernstein, P.L.C.

(57) ABSTRACT

An intermediating network is adapted to intermediate between an originating network and a servicing network. A first set of communications addresses in the originating network that can be used to originate communications to the servicing network are identified. A second set of communications addresses in the servicing network that can be used to service communications originating in the originating network are identified. The first set of communications addresses and the second set of communications addresses are analyzed. Based on the analyzing, incompatibilities between the first set of communications addresses and the second set of communications addresses that would prevent a communication from one of the first set of communications addresses from reaching the second set of communications addresses are determined. A processor of a computer is used to adapt the intermediating network so that the communication from the first set of communications addresses can be sent to the second set of communications addresses via the intermediating network. The communication from the originating network is received at the intermediating network and the communication is routed through the intermediating network to the servicing network.

20 Claims, 11 Drawing Sheets

(56) References Cited

U.S. PATENT DOCUMENTS

| | | |
|---|---|---|
| 7,983,254 B2 | 7/2011 | Alt et al. |
| 8,040,896 B2 | 10/2011 | Nguyen et al. |
| 8,081,631 B1 | 12/2011 | Chase et al. |
| 8,089,871 B2 | 1/2012 | Iloglu et al. |
| 8,184,641 B2 | 5/2012 | Alt et al. |
| 8,296,763 B1 | 10/2012 | Peercy et al. |
| 8,316,136 B2 | 11/2012 | Klimentiev et al. |
| 8,325,706 B2 | 12/2012 | Pacella |
| 8,351,435 B2 | 1/2013 | Mulligan et al. |
| 8,369,333 B2 | 2/2013 | Hao et al. |
| 8,407,323 B2 | 3/2013 | Flavel et al. |
| 8,411,667 B2 | 4/2013 | Scholl et al. |
| 8,417,938 B1 | 4/2013 | Considine et al. |
| 8,484,355 B1 | 7/2013 | Lochhead et al. |
| 8,537,854 B2 | 9/2013 | Bae et al. |
| 8,549,066 B1 | 10/2013 | Donahue et al. |
| 8,571,011 B2 | 10/2013 | Alt et al. |
| 8,601,091 B2 | 12/2013 | Venouss |
| 8,631,406 B2 | 1/2014 | Driesen et al. |
| 8,670,446 B2 | 3/2014 | Chase et al. |
| 8,695,059 B2 | 4/2014 | Kopti |
| 8,699,499 B2 | 4/2014 | Mulligan et al. |
| 8,713,628 B2 | 4/2014 | Kopti |
| 8,776,256 B2 | 7/2014 | Nguyen et al. |
| 8,799,997 B2 | 8/2014 | Spiers et al. |
| 8,805,951 B1 | 8/2014 | Faibish et al. |
| 8,806,606 B2 | 8/2014 | Ahmad et al. |
| 8,819,195 B2 | 8/2014 | Flavel et al. |
| 8,819,284 B2 | 8/2014 | Nguyen et al. |
| 8,651,525 B2 | 10/2014 | Durand et al. |
| 8,863,257 B2 | 10/2014 | Pal |
| 8,887,056 B2 | 11/2014 | Breternitz et al. |
| 9,137,202 B2 | 9/2015 | Nguyen et al. |
| 2004/0022247 A1* | 2/2004 | Chen .................. H04L 12/4608 370/395.5 |
| 2004/0223497 A1* | 11/2004 | Sanderson .......... H04L 12/4641 370/395.52 |
| 2006/0029035 A1 | 2/2006 | Chase et al. |
| 2006/0206606 A1 | 9/2006 | Iloglu et al. |
| 2007/0081535 A1* | 4/2007 | Li ........................ H04L 12/433 370/392 |
| 2008/0065783 A1 | 3/2008 | Iloglu et al. |
| 2010/0036953 A1* | 2/2010 | Bogovic ................ H04L 45/30 709/226 |
| 2011/0142053 A1* | 6/2011 | Van Der Merwe ..... H04L 47/72 370/395.1 |
| 2011/0299537 A1 | 12/2011 | Saraiya et al. |
| 2012/0151057 A1 | 6/2012 | Paredes et al. |
| 2013/0054426 A1 | 2/2013 | Rowland et al. |
| 2013/0077470 A1 | 3/2013 | Mulligan et al. |
| 2013/0110993 A1 | 5/2013 | Liu et al. |
| 2013/0182710 A1 | 7/2013 | Scholl et al. |
| 2013/0182712 A1 | 7/2013 | Aguayo et al. |
| 2013/0227672 A1 | 8/2013 | Ogg et al. |
| 2013/0254847 A1 | 9/2013 | Adams et al. |
| 2013/0276090 A1 | 10/2013 | Kopti |
| 2014/0044132 A1 | 2/2014 | Chase et al. |
| 2014/0181966 A1 | 6/2014 | Carney et al. |
| 2014/0223434 A1 | 8/2014 | Mulligan et al. |
| 2014/0250240 A1 | 9/2014 | Schell et al. |
| 2014/0289813 A1 | 9/2014 | Nguyen et al. |
| 2014/0310603 A1 | 10/2014 | Flavel et al. |
| 2014/0317616 A1 | 10/2014 | Chu |
| 2015/0143468 A1 | 5/2015 | Hebert et al. |
| 2016/0036943 A1* | 2/2016 | Kish .................. G06F 17/30864 709/203 |
| 2016/0112460 A1* | 4/2016 | Li ...................... H04L 63/0236 726/1 |

\* cited by examiner

Computer

INTELLIGENT ROUTE MANAGEMENT FOR DIVERSE ECOSYSTEMS

BACKGROUND

1. Field of the Disclosure

The present disclosure relates to the field of cloud computing ecosystems. More particularly, the present disclosure relates to intelligent route management for communications among entities in a diverse ecosystem.

2. Background Information

Cloud computing resources are currently provided by cloud computing resource providers as an independent service to a variety of customers. The customers may access cloud computing resources, such as memory and processing capacity in data centers, via public communication networks. The customers may contract with the communication network service provider(s) separately from the cloud computing resource provider(s).

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
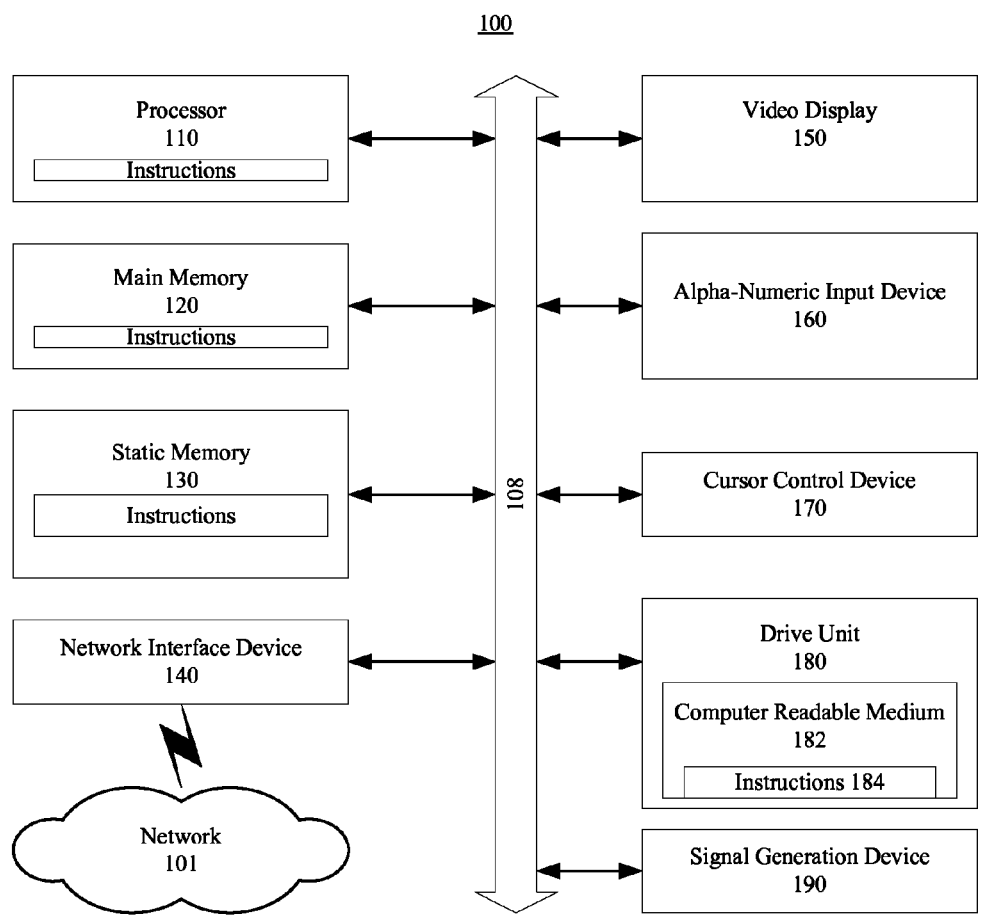
FIG. 1 shows an exemplary general computer system that includes a set of instructions for intelligent route management for diverse ecosystems.

FIG. 1 is an illustrative embodiment of a general computer system, on which a method of intelligent route management for diverse ecosystems can be implemented, and which is shown and is designated 100. The computer system 100 can include a set of instructions that can be executed to cause the computer system 100 to perform any one or more of the methods or computer based functions disclosed herein. The computer system 100 may operate as a stand-alone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a router, a server computer, a communications device, a control system, a web appliance, a network router, a switch or bridge, customer premise equipment (CPE), virtual private network (VPN) provider edge, an intelligent routing service control point (IRSCP), a network controller, a route reflector (RR), an edge (e.g., an infrastructure provider edge, an infrastructure customer edge, a virtual infrastructure customer edge), a router or router pair, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

As described herein, a private network can be made compatible with a foreign network, such as a cloud computing resource network, via a virtual private network. The virtual private network may be implemented by and/or for an entity such as a business that uses the virtual private network to allow multiple employees to communicate securely. The virtual private network may be implemented using one or more different public communication networks, any of which may be provided by, e.g., a (public) internet service provider that may be the same as or different from the virtual private network provider. The virtual private network services may be superimposed on one or multiple public communication networks provided by multiple different communications network providers.

The cloud computing resource network may be provided by a cloud service provider. The features described herein can be provided in part or entirely by a virtual private network (VPN) service provider, which as noted above may be entirely apart from the communication network provider(s). This includes equipment shown in FIGS. 4, 5, 6, 7 and 11 and described below, including a carrier VPN intra-autonomous system (AS) route reflector (RR), an intelligent routing service control point 482, a network controller, and an edge or edges. This also includes the methods and functionalities implemented with the equipment shown in FIGS. 4, 5, 6, 7 and 11.

As used herein, a foreign network can be a cloud service provider network (or cloud computing resource network). A foreign network can also be a second customer network, i.e., such as when communications occur between one private network and another. A foreign network may also be a third-party carrier network different from the public communications network on which the virtual private network(s) is implemented.

As described herein, incompatibilities between a customer's private network and a foreign network, such as a cloud computing resource network, can be sensed by the virtual private network provider by comparing characteristics, including addresses, in the customer's private network and the foreign network. These characteristics can include but are not limited to internet protocol (IP) address, type of IP address, IP port, differential services code point, location, autonomous system (AS), autonomous system transit policy, traffic type, application, communication source, dropped packet tolerance, delayed packet tolerance, disconnection tolerance, minimum/maximum bandwidth requirement, route table, route propagation policy and network software configuration parameters associated with the customer private network and the foreign network. Incompatibilities can be remedied by adapting the virtual private network.

That is, characteristics of a network include addresses in a network, as well as other such characteristics including those noted herein. Additionally, the incompatibilities that are sensed are between characteristics of two different networks, such as a private network on one side of an intermediating network, and a foreign network on another side of the intermediating network. A foreign network as described herein can include a cloud computing resource network.

Additionally, communications as described herein may be initiated by the private network or the foreign network, and also may be responses to communications. In other words, a communication that is analyzed herein can be an initial communication or a response to an initial communication, and can be either to or from a private network and from or to a foreign network. Communications may also be unidirectional or bidirectional. Moreover, the description herein may refer to analyzing addresses, but the analysis to identify incompatibilities is more generally applicable to characteristics of networks, where addresses are one form of characteristic of networks.

The intermediating network (including the virtual private network and associated underlying network(s) and virtualization infrastructure) acts as an intermediary between the customer's private network and the foreign network (e.g., cloud computing resource network). The virtual private network is adapted by modifying equipment, the arrangement of equipment, communications, communication addresses, communication characteristics, and/or the handling of communications. The description below provides for sensing and adaptation in ways that will allow entities with private networks to obtain resources from otherwise-incompatible foreign networks. The sensing and adaptation described herein are performed by and/or for the virtual private network or by and/or for the intermediating network (s) on which the virtual private network is implemented. The adaptation may be selective and dynamic, such as by checking actual source and destination addresses in a communication against a set of addresses and/or ranges of addresses so as to recognize communications that require selective modification. Alternatively, the adaptation may be wholesale, such as when all communications from a particular waypoint or with the same characteristics in the virtual private network or the cloud computing resource (or other foreign) network are routed to the same network node and handled in the same way. In other words, selective handling can be provided by analyzing addresses and/or other characteristics in communications, whereas wholesale handling can be provided for, e.g., all communications provided via a particular physical port or link from a virtual private network or cloud computing resource (or other foreign) network to a common network node.

The virtual private network described herein may include an intelligent routing service control point that securely manipulates customer routing to private cloud resources. The virtual private network may also include a network controller that coordinates and dynamically configures network resources in conjunction with the intelligent routing service control point. The network controller may be programmable to control other distinct network elements so as to resolve incompatibilities, including control of network-based virtualized routing and compute capabilities. The virtual private network may also include one or more infrastructure provider edge to extend a network common backbone to resources. Of course, a virtual private network provider may provide the above-noted intelligent routing service control point and network controllers for use for multiple virtual private networks for multiple customers.

An example of how virtual private networks are extended to connect to cloud resources (as an example of a foreign network) is via AT&T's NetBond, which is internet protocol/Multi-Protocol Label Switched (MPLS) VPN based, and can be used to provide virtual private network-based customers with access to services of cloud computing resource networks. The NetBond infrastructure includes a network controller, an intelligent routing service control point, and an infrastructure provider edge or edges as described herein. The NetBond infrastructure can be used to preposition common backbone capacity at data centers belonging to cloud computing resource network providers, in order to dynamically bind the cloud computing resource network providers to customers such as virtual private network customers.

A virtual private network may be a hybrid between a customer's private network and dedicated resources provided to the customer by a public communication network. In this way, communications involving the customer's end-points can be secured in the public communication network by isolating the communications from communications that don't involve the customer. Virtual private networks may use MPLS VPNs, tunneling, and as described herein may involve termination points on a customer edge or network-provider edge. Virtual private networks may also involve security such as encryption between edges and participant authentication.

The virtual private network equipment provided by a virtual private network provider, rather than the customer, may be considered "infrastructure", and may include separate edges to the customer and to foreign networks such as cloud computing resource networks. The edges may be labeled herein as infrastructure provider edges, infrastructure customer edges, and/or virtual infrastructure customer edges. Further, edges may be controlled by the network controllers described herein so as to be adapted such that incompatibilities between the customer's private networks and, e.g., the cloud computing resource networks, or other foreign networks, are resolved by the virtual private network infrastructure. An infrastructure provider edge and associated virtualization process (including the virtual computer system processing environment described herein) can be proactively switched into the path of a pathway between a pairing of a customer's private network and the foreign network(s), and then used as an intermediary mechanism to resolve incompatibilities as described herein.

The virtual private network provider may program a network controller with characteristics of the customer's private networks, virtual private networks assigned to the customer, and the cloud computing resource networks or other foreign networks. Each private network may have different characteristics, each virtual private network may have different characteristics, and each cloud computing resource network or other foreign network may have different characteristics. By comparing these characteristics for the different end-points attached to the network (i.e., customers and foreign) potential incompatibilities can be sensed.

The network controller can then be used to proactively adapt a virtual private network by switching the infrastructure provider edge and associated virtualization process into the pathway between the pairing of the customer's private network and, e.g., the cloud computing resource networks.

In this way, the virtual private network can be adapted such that communications can be routed through and/or by the infrastructure provider edge and addresses added, modified, virtualized, bypassed for particular characteristics, or otherwise set. As a result, communications from any actual address on the customer's private network can be routed to any actual address on the cloud computing resource network or other foreign network, even if this would be impossible without the adaptation.

The network controller can control infrastructure provider edges, along with routers and servers in the virtual private network. The virtual private network can be adapted by taking incoming traffic to and from the customer, and running it through virtualization processes so as to make the traffic compatible between the virtual private network and the cloud computing resource network or other foreign network. The virtualization processes may be carried out by a virtual router, implemented by an infrastructure provider edge, that adapts traffic flows by, e.g., filtering, rate-limiting, and route filtering, in order to act as a virtual shuttle point to shuttle traffic between the virtual private network and the foreign network.

Route filtering is a process wherein a mismatch between a large number of network addresses on, e.g., a customer's private network or a virtual private network, and a tolerance for only a small number of such network addresses by, e.g., the cloud computing resource network, are made compatible by grouping sets within the large number of network addresses for dynamic virtual translation so as to appear to be fewer addresses. An example of route filtering would be to group 100 addresses connected to a virtual private network at a single facility and point communications to and from the 100 addresses to a single waypoint. In this way, the address of the single waypoint can be used as the virtual address for all 100 of the addresses connected to the virtual private network, and the foreign network's lack of tolerance for the large number of counterpart network addresses can be satisfied. Many such groups of large numbers of network addresses may be treated similarly and assigned to different waypoints as a virtualization. In this way, 10000 network addresses grouped into 100 groups can appear to the foreign network as only 100 counterpart addresses, which are in reality just 100 waypoint addresses for the 10000 network addresses.

Route filtering is also a process wherein a mismatch between a large number of border gateway protocol (BGP) routes on a first network and a small number of such routes on a second network are made compatible. The large number of BGP routes may be on, for example, a customer's private network or a virtual private network identified with an autonomous system (AS) number. The small number of routes may be on, for example, a cloud computing resource network identified with a different autonomous system (AS) number. The large number of routes and small number of routes are made compatible by grouping sets within the large number of routes for dynamic virtual translation so as to appear to be fewer routes. An example of route filtering would be to group 100 routes on a virtual private network at a single facility and point communications to and from the addresses represented in the routes to a single waypoint, advertised from the customer VPN to the foreign network by the intermediating network (e.g. using the EBGP protocol). In this way, a route of the single waypoint can be used as the virtual route for all 100 of the routes used on the virtual private network, and the cloud computing resource network's lack of tolerance for the large number of counterpart network routes can be satisfied. Many such groups of large numbers of network routes may be treated similarly and assigned to different waypoints as a virtualization. In this way, 1000000 network addresses reachable using 10000 routes on a customer VPN grouped into 100 groups can appear to the cloud computing resource network (or other foreign network) as only 100 counterpart EBGP routes, which are in reality a path of just 100 waypoint routes for the 1000000 network addresses.

Figure 2:
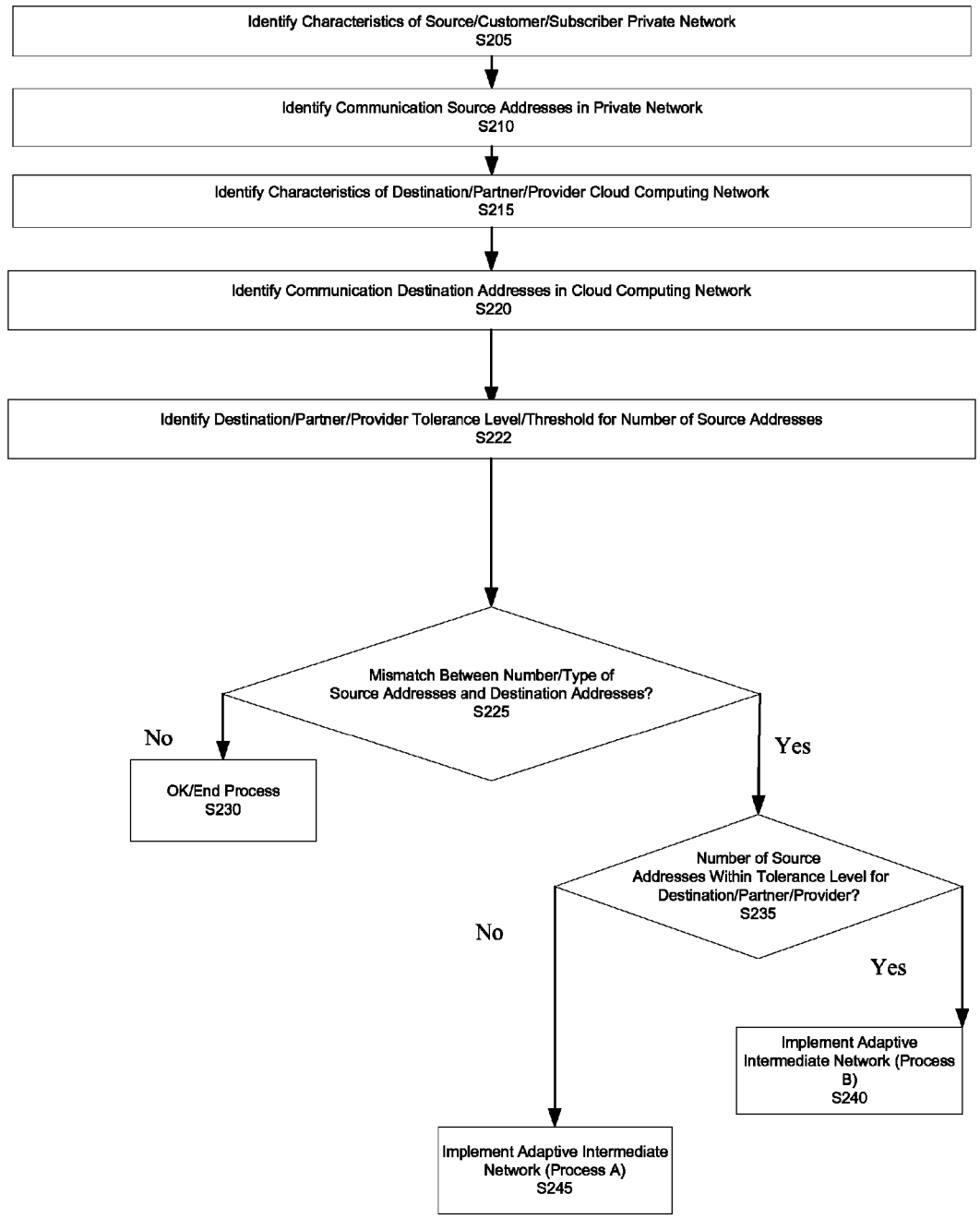
FIG. 2 shows an exemplary method for intelligent route management for diverse ecosystems, according to an aspect of the present disclosure.

FIG. 2 shows an exemplary method for intelligent route management for diverse ecosystems, according to an aspect of the present disclosure. In FIG. 2, the process begins at S205 by identifying characteristics of private networks belonging to sources, customers and/or subscribers. The private networks described herein are the basis of virtual private networks described herein. The virtual private network are provided by a virtual private network provider, using infrastructure superimposed on and between the private network and public networks to ensure communications over the virtual private network are not exposed to others outside of the virtual private network.

At S210, communication source addresses in the private network are identified. The identification at S210 may include counting the number of communication source addresses that may be used, that are expected to be used, and/or that are authorized for use. The identification may include listing the actual address as well as any ranges of addresses assigned for use in the private network. As noted elsewhere herein, addresses may be public addresses such as Internet Protocol addresses, or may be internal private addresses used internally on the private network.

At S215, characteristics of a cloud computing network (or other foreign network) belonging to a destination, a partner, and/or a provider are identified. At S220, communication destination addresses in the cloud computing network are identified. Addresses in the cloud computing network may be public addresses such as Internet Protocol addresses, or may be internal addresses used internally in the cloud computing network.

At S222, a tolerance level or threshold is identified for the destination/partner/provider. The tolerance level is a number of source addresses (or BGP routes) in the private network/virtual private network that can be properly recognized by the foreign (e.g., cloud computing) network. The tolerance level reflects the maximum number of source addresses (or BGP routes) that can be used in communications sent to the foreign network. As described herein, if the actual number of source addresses (or BGP routes) in the virtual private network is greater than the tolerance level, then the sources addresses in the virtual private network can be virtualized as a way to shuttle communications through waypoints in order to allow a single waypoint to act as a virtual proxy for multiple individual source addresses. Multiple waypoints can each be used as actual or virtual proxies for different sets of individual source addresses (or BGP routes) in a virtual private network. This virtualization (e.g., use of proxies and/or proxy addresses) can be used to make otherwise incompatible customer's private networks and foreign networks compatible.

At S225, a determination is made as to whether there is a mismatch between the number and/or type of source addresses in the private network/virtual private network and destination addresses in the cloud computing network. If there is no mismatch (S225=No), the process ends at S230. If there is a mismatch (S225=Yes), a determination is made as to whether the number of source addresses are still within the tolerance level for the destination/partner/provider at S235. If the number of addresses are within the tolerance level (S235=Yes), the virtual private network is adapted at S240 by a process "B" to remedy an incompatibility between the type of addresses on the private network and the type of addresses on the cloud computing network. Process B involves virtual network address translation rather than route filtering. Virtual network address translation provides a desired type of address to replace an incompatible type of address. A virtual network address translation process can be used to provide compatibility between two different private networks or a private network and a public network, insofar as one network might not recognize addresses in the other. If the number of addresses are not within the tolerance level (S235=No), the virtual private network is adapted at S245 by a process "A" such that communications can be completed between the virtual private network and the cloud computing network. Process A involves route filtering as described herein, and is performed to remedy an incompatibility between the number of addresses on the private network and the route tolerance level of the cloud computing network. Additionally, other forms of incompatibilities noted herein may also be remedied by adaptation, and these other forms of incompatibilities could be remedied in alternatives to S240 and S245 in FIG. 2.

As an alternative to the process described above for FIG. 2, characteristics other than addresses can be analyzed to determine at S225 whether there is a mismatch between the characteristics in the private network/virtual private network and destination addresses in the foreign network. If there is no mismatch (S225=No), the process ends at S230. If there is a mismatch (S225=Yes), a determination is made as to whether the characteristics are still within the tolerance level for the destination/partner/provider/network at S235. If the characteristics are within the tolerance level (S235=Yes), the process ends at S240 instead of a process B being performed. If the characteristics are not within the tolerance level (S235=No), the virtual private network is adapted at S245 such that communications can be completed between the virtual private network and the cloud computing or other foreign network.

Figure 3:
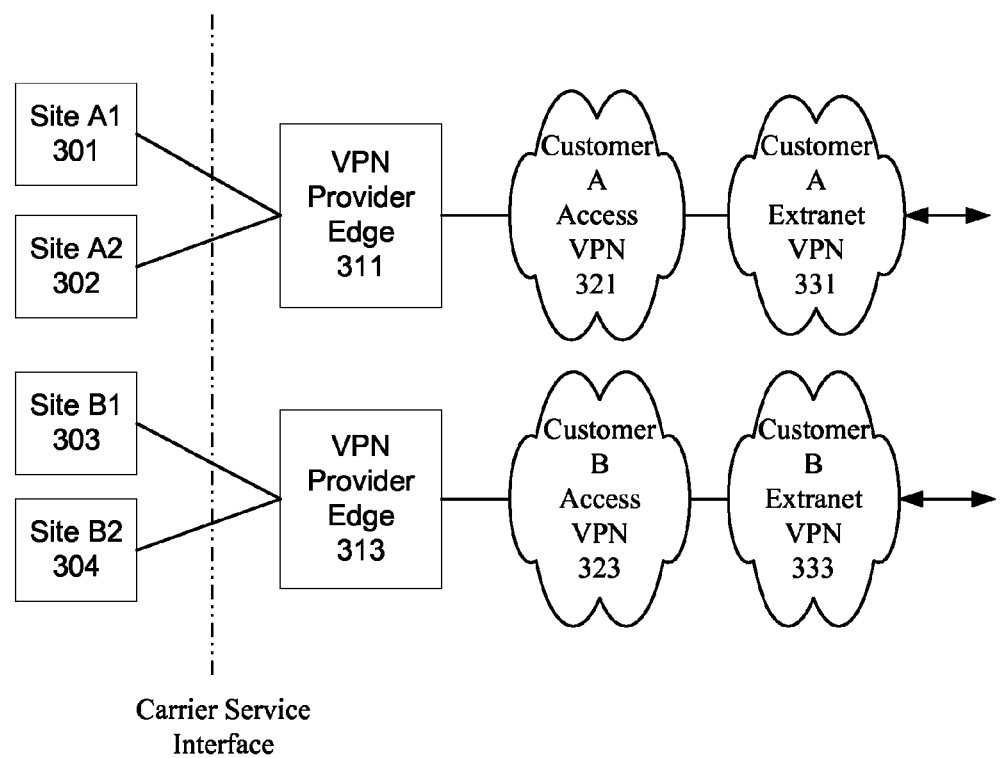
FIG. 3 shows an exemplary partial network for intelligent route management for diverse ecosystems, according to an aspect of the present disclosure.

FIG. 3 shows an exemplary partial network for intelligent route management for diverse ecosystems, according to an aspect of the present disclosure. FIG. 3 shows a customer side of a communication network that includes the virtual private network and the customer's individual sites and the VPN Provider Edge serving those sites. Sites for customer A include Site A1 301 and A2 302, each of which communicates through a single VPN Provider Edge 311 over a carrier service interface. Sites for customer B include Site B1 303 and Site B2 304, each of which communicates through a single VPN Provider Edge 313 over a carrier service interface. Sites A1, A2, B1 and B2 are shown to represent that a VPN for a single customer may include multiple different sites at different geographical locations. Each site may include multiple individual communications addresses, such as would be found at an office building. Additionally, Sites A1 and A2 communicate through Customer A Access virtual private network 321 and through Customer A Extranet virtual private network 331. Sites B1 and B2 communicate through Customer B Access virtual private network 323 and through Customer B Extranet virtual private network 333.

Figure 4:
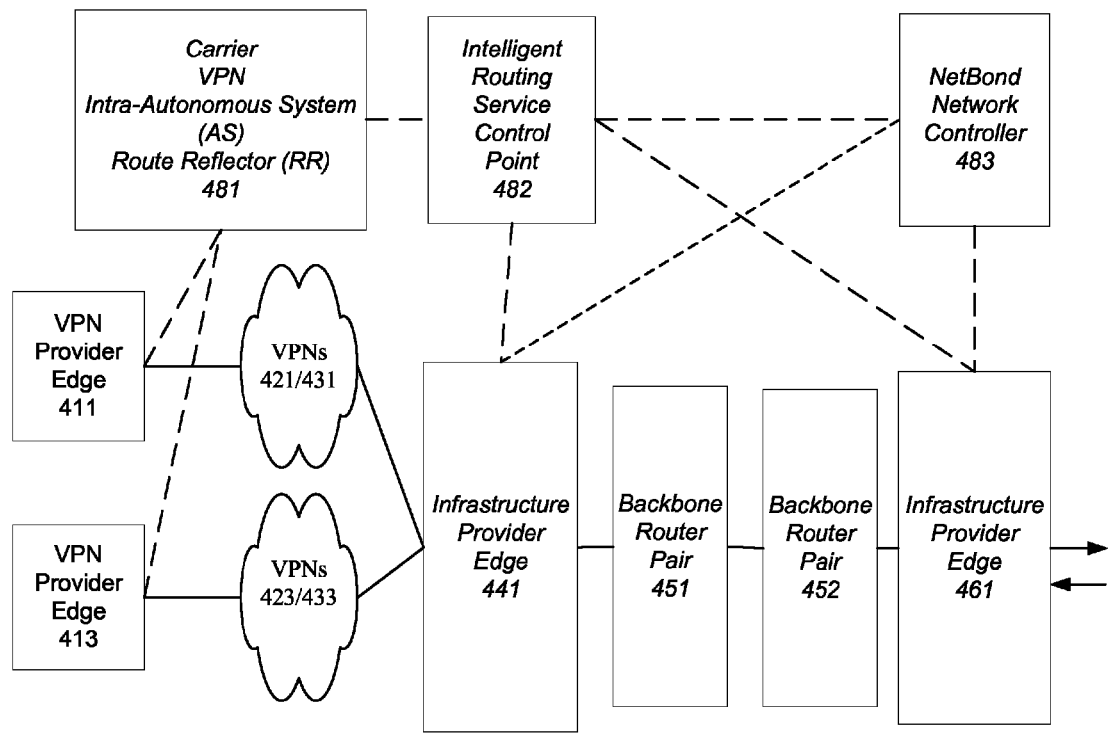
FIG. 4 shows an exemplary network for intelligent route management for diverse ecosystems, according to an aspect of the present disclosure.

FIG. 4 shows an exemplary network for intelligent route management for diverse ecosystems, according to an aspect of the present disclosure. In FIG. 4, portions of the virtual private network shown in FIG. 3 are shown, along with features of the communication network(s) (public) used to intermediate communications between virtual private networks and foreign networks such as cloud computing networks. In FIG. 4, as well as in FIGS. 5-7, additional aspects of the virtual private network provided by the virtual private network provider include a carrier virtual private network intra-autonomous system (AS) route reflector, an intelligent routing service control point, a network controller, and at least one infrastructure provider edge. Additional aspects of the intermediating (public) communications network shown in FIG. 4 include backbone router pairs 451, 452 between edges 441, 461.

The carrier virtual private network intra-autonomous system (AS) route reflector 481, intelligent routing service control point 482 and network controller 483 in FIG. 4 are used to control the infrastructure provider edges 441 and 461, as well as the virtual private network provider edges 411 and 413. The handling of communications that pass through the backbone router pair 451 and 452 of the communication network is therefore controlled selectively in FIG. 4 for communications between the virtual private network and the cloud computing network. In other Figures, communications are similarly selectively handled, though adaptation occurs in the infrastructure provided by the virtual private network provider. The selective control may be by virtualizing addresses for communications from the virtual private network, so as to make the communications appear to originate from a smaller set of addresses than they actually are. In this way, the communications are adapted individually at, e.g., the infrastructure provider edge 441 before proceeding through the communication network(s) that includes the backbone router pair 451 and 452.

An Intelligent Routing Service Control Point 482 as described herein securely manipulates customer routing to private cloud resources in the virtual private network. A Network Controller 483 as described herein coordinates and dynamically configures network resources in the virtual private network. Infrastructure Provider Edges 441, 461 extend a carrier (e.g., AT&T®, Verizon®) common backbone (i.e. 451 and 452) to foreign network (including cloud processing) resources.

Using virtual private network elements as shown in FIG. 4 and other Figures described herein, a virtual private network provider can deliver private, highly secure, elastic cloud processing and networking resources. The NetBond Network Controller 483 and the Intelligent Routing Service Control Point 482 eliminate many security and complexity barriers to cloud adoption. The network elements in FIG. 4 and other Figures herein allow the virtual private network provider to leverage multi-protocol label switching (MPLS) virtual private network flows (predominantly) in a way that reduces vulnerabilities to traditional internet performance concerns of e.g., inconsistent packet delay, bandwidth restrictions and dropped packets.

NetBond is an internet protocol/MPLS VPN core backbone-based capability provided to a variety of cloud service providers with differing capabilities. In this case, cloud service providers may be referred to as NetBond Partners. The NetBond partners obtain access to the carrier's pre-positioned core backbone capacity at the NetBond Partner's data center(s) and are dynamically bound to a carrier's customer's virtual private network access. In FIG. 4, Infrastructure Provider Edge 461 is a network element or system that interfaces the communication network and the cloud computing network. In other Figures, the analogous Edge to the cloud computing network (or other foreign network) may be provided by an Infrastructure Customer Edge that belongs to the carrier but is deployed on the Partner's site, or may belong to the communication network but be running on the computing resources provided by the carrier or the Partner as a Virtual Infrastructure Customer Edge.

Figure 5:
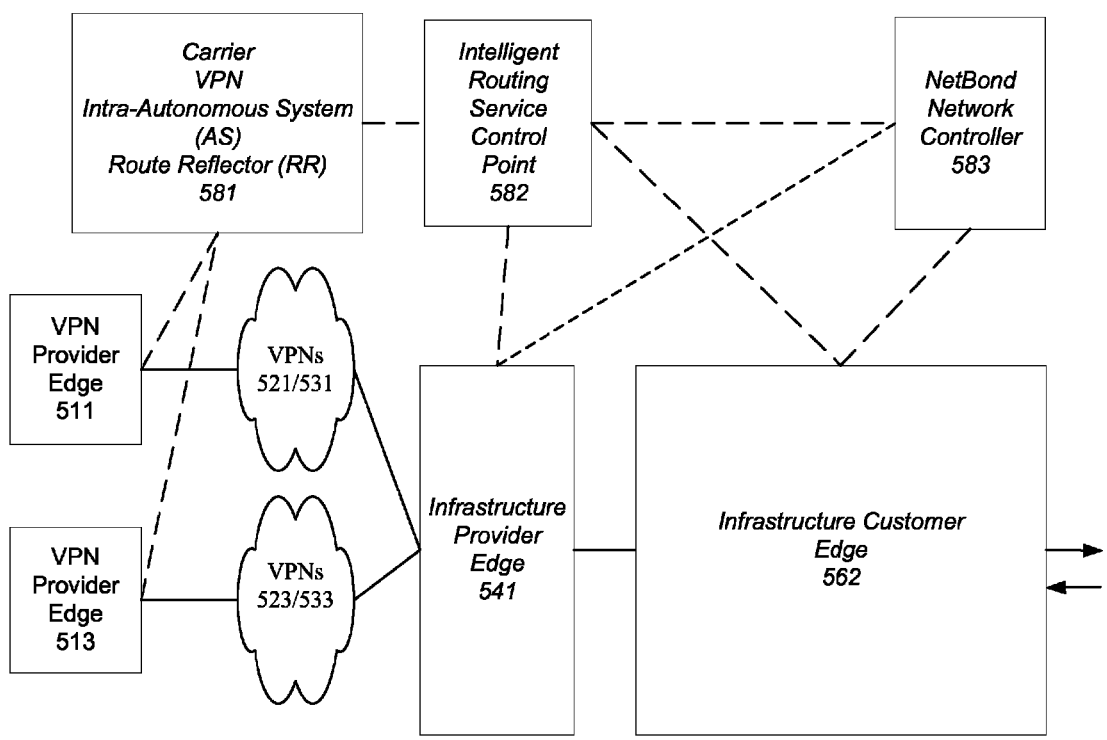
FIG. 5 shows an exemplary network for intelligent route management for diverse ecosystems, according to an aspect of the present disclosure.

FIG. 5 shows an exemplary network for intelligent route management for diverse ecosystems, according to an aspect of the present disclosure. In FIG. 5, for example, the Infrastructure Provider Edge 461 from FIG. 4 is replaced by an Infrastructure Customer Edge 562.

Figure 6:
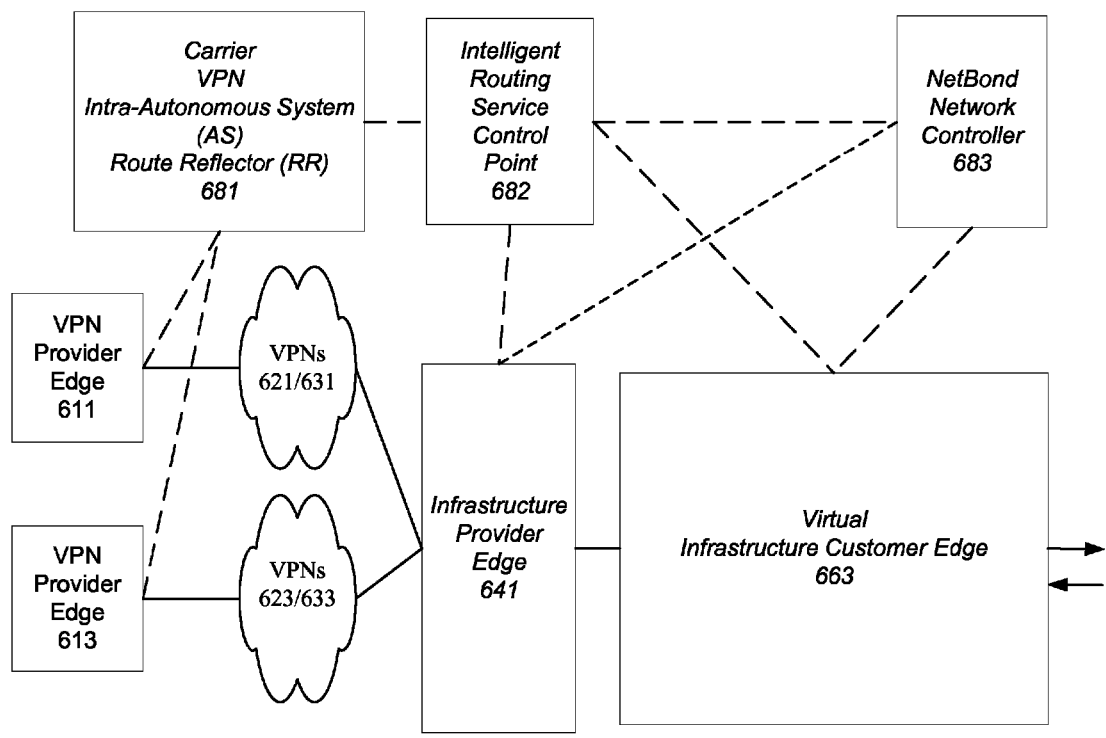
FIG. 6 shows an exemplary network for intelligent route management for diverse ecosystems, according to an aspect of the present disclosure.

FIG. 6 shows an exemplary network for intelligent route management for diverse ecosystems, according to an aspect of the present disclosure. In FIG. 6, for example, the Infrastructure Provider Edge 461 from FIG. 4 is replaced by a Virtual Infrastructure Customer Edge 663.

Figure 7:
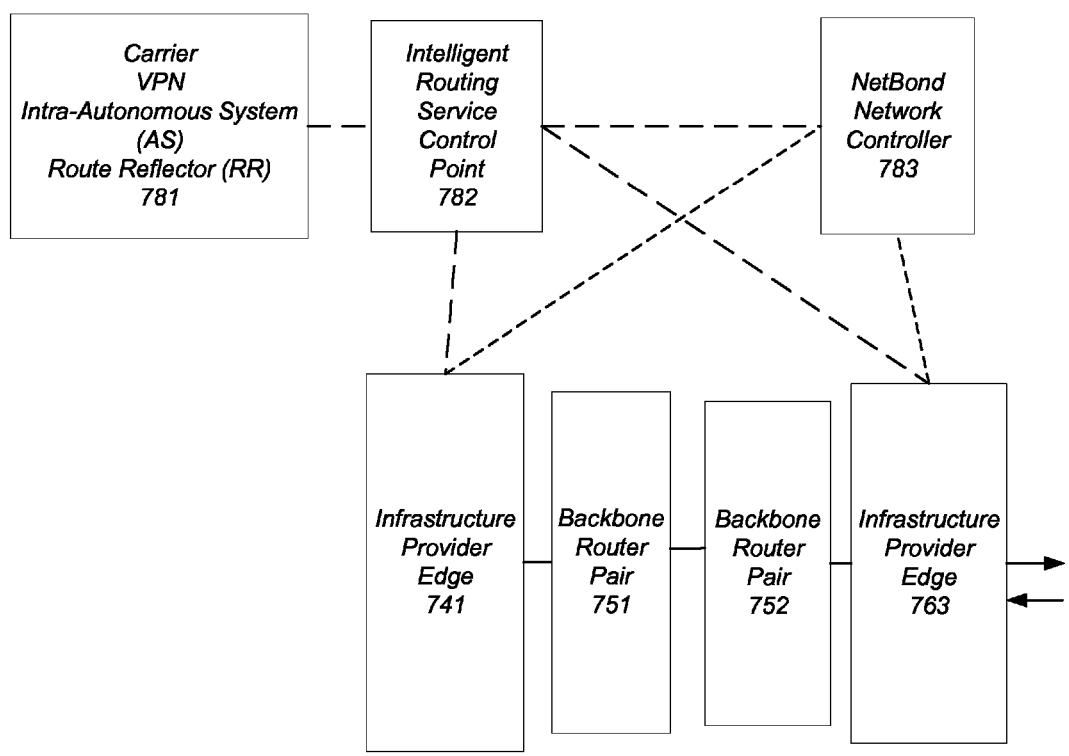
FIG. 7 shows an exemplary partial network for intelligent route management for diverse ecosystems, according to an aspect of the present disclosure.

FIG. 7 shows an exemplary partial virtual private network infrastructure for intelligent route management for diverse ecosystems, according to an aspect of the present disclosure. In FIG. 7, relevant elements of a virtual private network controlled by the virtual private network provider are shown without showing particular features of the customer's private network or the cloud computing network or other foreign network. That is, the back-end features that control the actual routing elements include carrier VPN intra-autonomous system (AS) route reflector 781, intelligent routing service control point 782, and NetBond network controller 783. The routing elements include infrastructure provider edge 741 that interfaces to the customer's private network (not shown), backbone router pair 751 and 752, and the edge 763. Edge 763 is an infrastructure provider edge, and interfaces to the cloud computing network.

In comparison to the use of an infrastructure provider edge 763 in FIG. 7 and infrastructure provider edge 461 in FIG. 4, a backbone router pair is not typically provided between two edges shown in FIGS. 5 and 6. This is because an infrastructure customer edge 562 or virtual infrastructure customer edge 663 is typically an extension of the infrastructure provider edges 541, 641 provided by the virtual private network provider. Therefore, an intermediate backbone router pair is typically not provided between infrastructure provider edge 541 and infrastructure customer edge 562, or between infrastructure provider edge 641 and virtual infrastructure customer edge 663.

Figure 8:
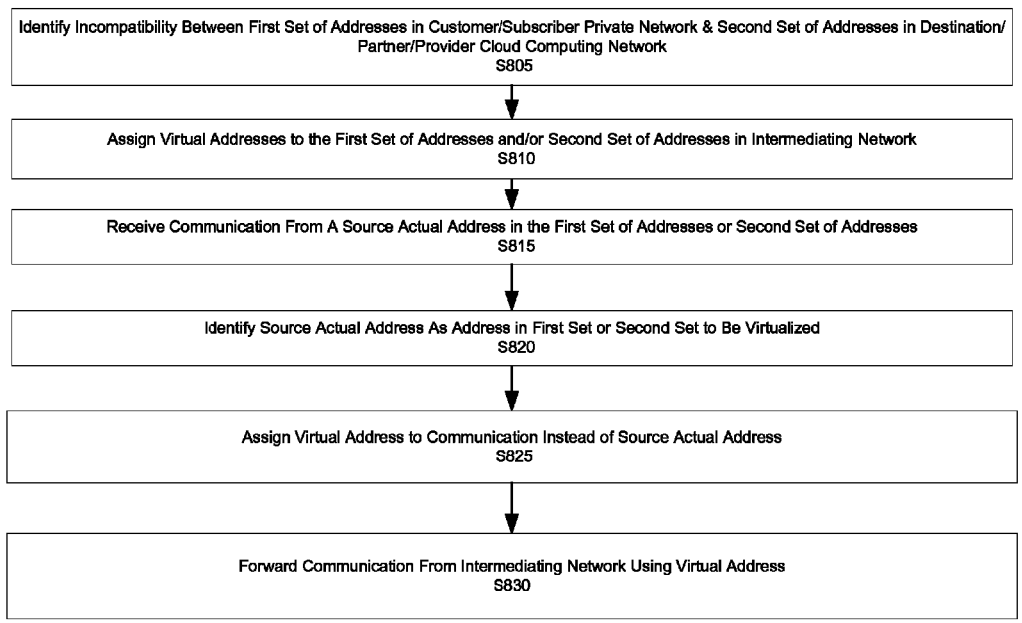
FIG. 8 shows an exemplary method for intelligent route management for diverse ecosystems, according to an aspect of the present disclosure.

FIG. 8 shows an exemplary method for intelligent route management for diverse ecosystems, according to an aspect of the present disclosure. In FIG. 8, an incompatibility between a first set of addresses in a private network and a second set of addresses in a cloud computing network or other foreign network is identified at S805. The private network may belong to a customer or subscriber of a communication network provider. The cloud computing network or other foreign network may belong to a partner of the virtual private network provider and/or the communication network provider.

At S810, virtual addresses are assigned in and/or by the virtual private network provider to the first set of addresses and/or the second set of addresses. The communication network is an intermediary of the private network and the cloud computing network. The assigned virtual addresses are assigned as a form of virtualization or means of access to a virtualization process to make the private network compatible with the foreign (e.g., cloud computing) network. The first set of addresses and second set of addresses can be designated for a flow originating in the private network or in the foreign network. The first set of addresses and second set of addresses can be designated for an initiating flow originating in either network and a response flow originating in the opposite network. The intermediary virtualization process can therefore be applied to a bi-directional flow in either direction or in both directions, and originating in either the private network or the foreign network. In other words, a communication path for a communication may be either to or from a private network and from or to a cloud service provider or other foreign network. Further, communications may be unidirectional or bidirectional.

At S815, a communication from a source actual address in the first set of addresses or the second set of addresses is received. The virtual private network infrastructure identifies the source actual address as an address in the first set of addresses or second set of addresses to be virtualized at S820. At S825, a virtual address is assigned to the communication instead of the source actual address. There are several possible approaches for doing the address manipulation described herein. For example, a virtual address can be inserted by manipulating route announcements within the VPN, adding a new label in a multi-protocol label switching (MPLS) network, or may be added as a temporary replacement address in another network. At S830, the communication is forwarded from the virtual private network using the virtual address.

In FIG. 8, the virtualization of a source actual address can be used to ensure the communication is accepted by the destination network. The virtual address may be an address of an actual waypoint for the communication, such as when the actual waypoint has an address that is on a limited set of addresses that will be accepted by the destination network. In this way, a set of addresses in the source network that is too large for the destination network to handle can be reduced to a set of virtual addresses by the intermediating network, so that the source network addresses are virtualized in a way that can make the private network and the cloud computing network compatible.

Figure 9:
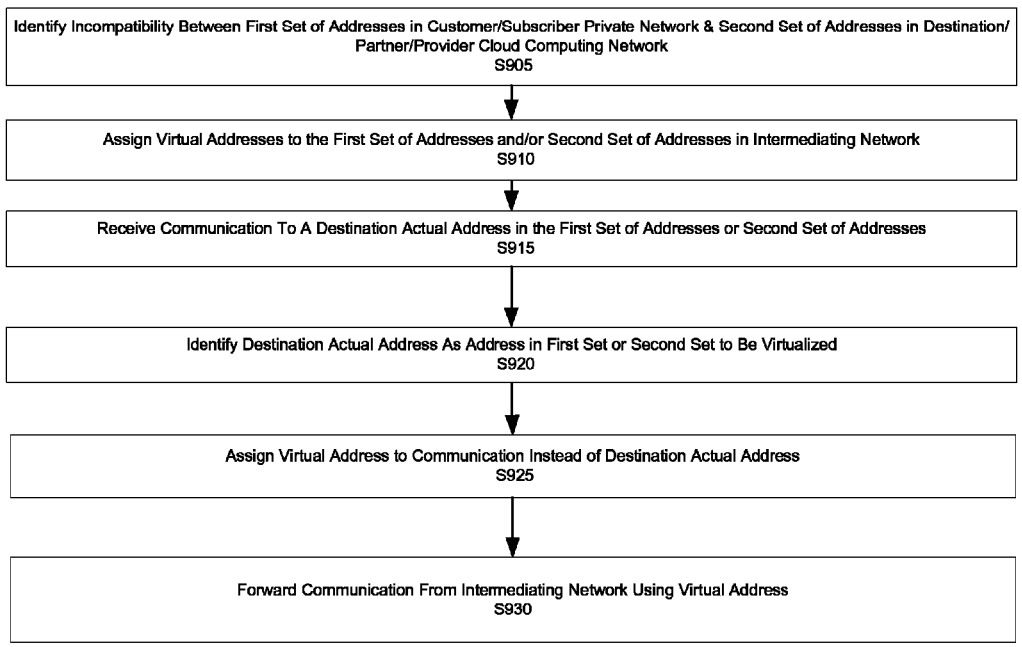
FIG. 9 shows an exemplary method for intelligent route management for diverse ecosystems, according to an aspect of the present disclosure.

FIG. 9 shown an exemplary method for intelligent route management for diverse ecosystems, according to an aspect of the present disclosure. In FIG. 9, an incompatibility between a first set of addresses in a private network and a second set of addresses in a cloud computing network (or other foreign network) is identified at S905. At S910, virtual addresses are assigned to the first set of addresses or the second set of addresses. At S915, a communication to a destination actual address in the first set of addresses is received. At S920, the destination actual address is identified as an address in the first set of addresses or second set of addresses to be virtualized. At S925, a virtual address is assigned to the communication instead of a destination actual address. At S930, the communication is forwarded from the virtual private network using a virtual address.

In FIG. 9, the communication network recognizes a destination address as an address to be virtualized rather than a source address. In this sense, the sending network may understand only the virtual addresses assigned to the destination network addresses, so that these virtual addresses need to be supplemented or replaced in order to reach the correct actual address. That is, the virtualization in FIG. 9 may be a form of unvirtualization, in order to send a communication to the actual proper address when the communication is received with a virtual address assigned as the destination.

Figure 10:
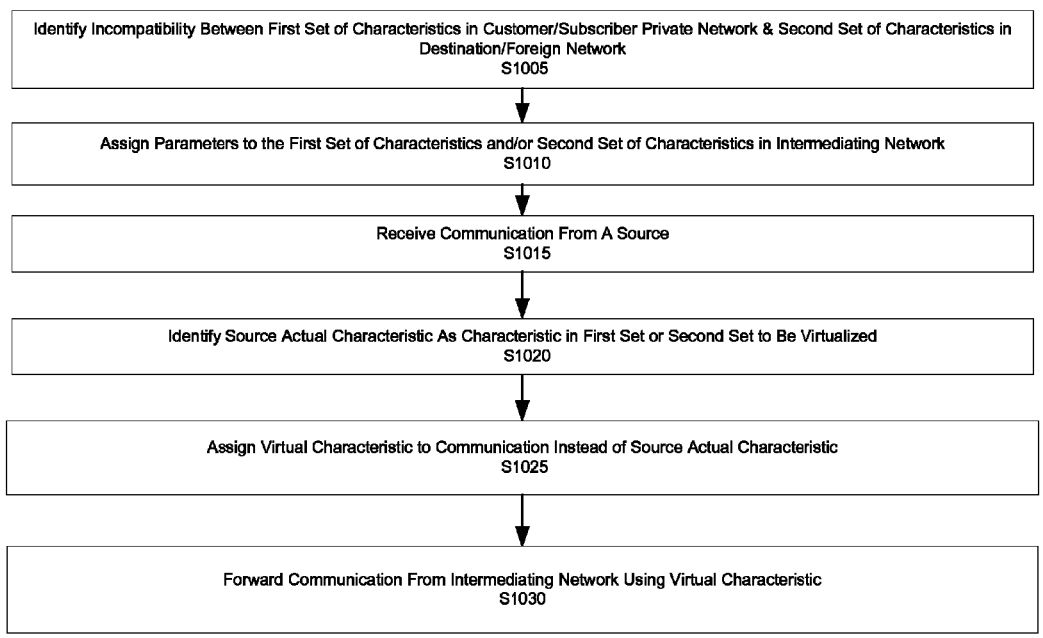
FIG. 10 shows another exemplary method for intelligent route management for diverse ecosystems, according to an aspect of the present disclosure.

FIG. 10 shows an alternative to FIG. 8. In FIG. 10, an exemplary method for intelligent route management for diverse ecosystems identifies an incompatibility between a first set of characteristics in a private network and a second set of characteristics in a foreign network. At S1005, an incompatibility between the first set of characteristics in a customer/subscriber private network and a second set of characteristics in a destination/foreign network is identified.

At S1010, parameters are assigned to the first set of characteristics and the second set of characteristics in an intermediating network. At S1015, a communication is received in the intermediating network from a source, and at S1020, a source actual characteristic is identified as a characteristic in the first set or second set to be to be virtualized. At S1025, a virtual characteristic is assigned to the communication instead of (i.e., in place of) the source actual characteristic. At A1030, a communication is forwarded from the intermediating network using the virtual characteristic. The private network may belong to a customer or subscriber of a communication network provider. The foreign network may belong to a partner of the virtual private network provider and/or the communication network provider or a different carrier.

Figure 11:
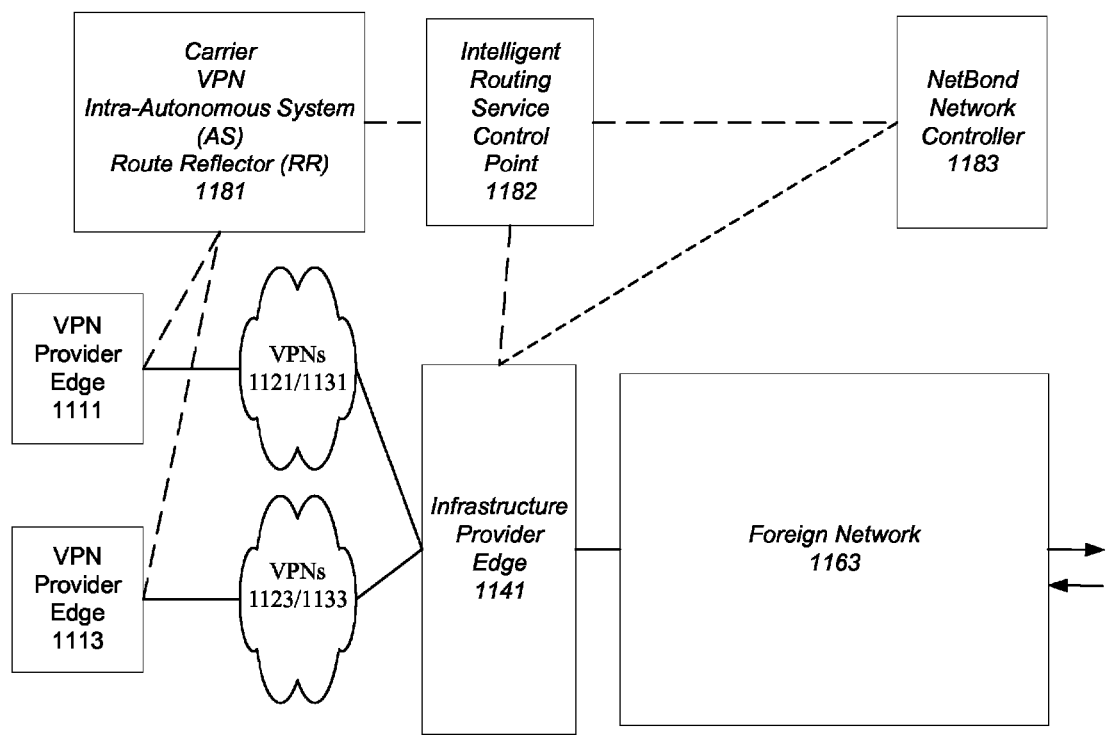
FIG. 11 show another exemplary network for intelligent route management for diverse ecosystems, according to an aspect of the present disclosure.

FIG. 11 shows an alternative to FIG. 6. In FIG. 11, there is no particular requirement for infrastructure such as a virtual infrastructure customer edge 663 shown in FIG. 6. Rather, the foreign network 1163 is in a location separated from the infrastructure provider edge 1141. The different location may be a co-located data centre, such that a network carrier does not need to preposition infrastructure in order to interface with a foreign network such as a cloud resource network.

Using the features described herein, a customer such as an enterprise can connect to cloud infrastructure and applications via a communication network. A virtual private network service provider may provide a virtual private network that satisfies a customer's concerns about security. A multi-protocol label switching (MPLS) virtual private network (VPN) can be extended using the infrastructure described herein, to cloud service providers for the delivery of business applications through the secure connectivity of the virtual private network. The virtual private network service provider can provide traffic routing flexibility so as to achieve compatibility between otherwise incompatible customers and cloud service providers. Using the virtual private network, a customer's traffic can be isolated from the Internet and from other cloud traffic to thereby reduce risks.

Accordingly, intelligent route management for diverse ecosystems enables a virtual private network provider to extend services for customers to cloud service providers, even when the cloud service providers would otherwise be incompatible with the customers' private networks. The virtualization described herein can be used to adapt communications dynamically so as to allow communications between a range or number of addresses that otherwise could not be used between a customer of a virtual private network and a cloud service provider.

Although intelligent route management for diverse ecosystems has been described with reference to several exemplary embodiments, it is understood that the words that have been used are words of description and illustration, rather than words of limitation. Changes may be made within the purview of the appended claims, as presently stated and as amended, without departing from the scope and spirit of intelligent route management for diverse ecosystems in its aspects. Although intelligent route management for diverse ecosystems has been described with reference to particular means, materials and embodiments, intelligent route management for diverse ecosystems is not intended to be limited to the particulars disclosed; rather intelligent route management for diverse ecosystems extends to all functionally equivalent structures, methods, and uses such as are within the scope of the appended claims.

As described above, a broad range of a service provider's customers and cloud computing partners or other foreign networks can be tied together into a common ecosystem. Intelligent mechanisms are provided to adapt to the varying levels of capabilities of the ecosystem players (e.g., customers and partners). The route load is an example of an area that is adapted according to the present disclosure, wherein the service provider can distribute/redistribute the route load among the ecosystem players in order to minimize impact on players. This in turn allows the virtual private network service provider to increase adoption of the ecosystem. As described herein, a network-based sensing and adaptation mechanism allows the diverse players to retain their native capabilities but facilitates communication among them.

A virtual private network service provider can build a broad and diverse ecosystem that offers multi-protocol label switching (MPLS) virtual private network (VPN) communications for customers. The ecosystem can be used to offer the MPLS VPN customers access to various cloud computing network providers (partners) or other foreign network providers who provide services to the customers via the communication service provider's network and to other carriers who provide network services to the same or other customers. While the diversity is described mainly herein as diversity in route loads and the ability to complement route loads, the customers and partners will have many other forms of diversity that may also require adaptation. For route loads, as described above, customers may generate route loads ranging from double digits (i.e., 10's of routes) to 10's of thousands of routes. Foreign networks as described herein can include partners of a virtual private network provider, other carriers, cloud service providers, and other networks. Such foreign networks also are quite diverse in their range of their capabilities for consuming routing information, wherein some can consume a significant load but others have only a limited ability to consume, such as less than 100 routes per customer.

As described herein, an adaptation mechanism avoids a need for the virtual private network service provider to limit the connectivity to the least common denominator of the pairing. This in turn allows the virtual private network service provider's ecosystem to provide any-to-any route load matching and thereby maximize the value of any communication network/ecosystem.

As described herein, a network-based mechanism intelligently "senses" when a potential incompatibility exists between ecosystems players (e.g., between customer/partner, customer/customer and partner/partner). The mechanism proactively adapts the virtual private network by switching into the path of the incompatible pair an "adaptation" mechanism which allows the communication to occur without the need for the customer to change (usually: reduce) their route load or the partner to change (usually: increase) their route consumption capabilities. By providing an intermediary mechanism which adapts the broad range of ecosystem players (customers and partners) so that they can freely communicate among each other, the value of the ecosystem itself can be maximized for both sides.

Criteria that can lead to incompatibility between customers with private networks and cloud service providers (CSPs) in a private networked cloud environment, and that can be addressed by sensing and adaptation as described herein by a virtual private network service provider include:

Type of IP Addressing (private/public addressing). A customer private network may use private network addresses, such as a specific range of addresses that can be re-used by other customers in their own private networks. When the customer's private network is connected to a cloud service provider this can lead to incompatibility when the cloud service provider can only support public network addresses. The virtual private network provider can remedy this by virtualizing the private network addresses as described herein.

Standard of IP Addressing (IPv4/IPv6). Even if all customers and cloud service providers support internet protocol version 4 (IPv4), one or more may not support internet protocol version 6 (IPv6). For a customer that has implemented IPv6 within a private network connecting to a cloud service provider that only supports IPv4, this can result in an incompatibility that will require adaptation to complete the connection.

Route Load. Typically within a private network a customer announces the addressing for individual sites via border gateway protocol (BGP) route announcement methods. A route is a statement identifying a particular address prefix (range of addresses) and how to reach that address. Different customers may have fewer than 100 routes, or as many as 100000 routes. When a foreign network connects to a customer's private network these routes become visible to them and create an incompatibility based on the large count of routes, or route load. The foreign network needs to be able to process and respond correctly and compatibly to them. A virtual private network provider can remedy any processing incompatibilities by virtualizing the private network addresses as described herein.

Security Domains. Within a private network a customer can set up multiple security domains and use security mechanisms (e.g., Firewall) to bridge endpoints that are not in the same security domain. Customers may think of their private network as a "trusted" domain, and may consider a cloud service provider as an "untrusted" domain. So directly connecting the private network security domain and the cloud service provider security domain is an incompatibility, which can be addressed by virtualizing communications addresses as described herein.

Bandwidth/Usage Charges. A private network may incur fixed costs associated with bandwidth used on a virtual private network and/or public networks (pay a fixed charge for a network and use as much data as can be fit within the capacity allocated). Usage-sensitive bandwidth charges are generally applied either by the network provider, the cloud service provider, or both when the private network is connected to the cloud service provider. This can create a "business policy" incompatibility in that the customer does not want to have an open-ended interface where large amounts of unexpected bandwidth/usage charges can get racked up. Customers can use an adaptation mechanism as described herein to limit charges and throttle access to the cloud service provider appropriately.

Packet Sizes. Within a private network a customer can use packet sizes ranging from the standard of roughly 1500 bytes, to jumbo frames of roughly 9000 bytes. Some cloud service providers only support the standard size packet and will require adaptation if the customer is using the larger packet sizes. An adaptation mechanism as described herein can be used to reconfigure packets so as to be accepted by the cloud service provider.

IP Port. Within a virtual private network or a foreign network a port may be associated with an IP address of a host. Some foreign networks only support particular ports. An adaptation mechanism as described herein can be used to reconfigure port numbers so as to be accepted by the cloud service provider. An adaptation mechanism as described herein can also be used to represent individual addresses on the VPN on individual port numbers so as to be accepted by the cloud service provider.

Differential Service Code Point. Originating networks and serving networks can use the differentiated services code point field in the IP header to classify and mark packets to communicate instructions for per-hop traffic management policies. However, mechanisms used within originating and serving networks to provide per-hop traffic management may be incompatible, resulting in dropped packets, poor performance or increased usage billing. An adaptation mechanism as described herein can be used to reconfigure the DSCP field to enable compatibility of traffic management policies between endpoints on the originating and serving networks.

Location. A customer may require a policy whereby a particular location of a physical interface between an originating network and a serving network only be used to connect particular endpoints on the originating network and the serving network. An adaptation mechanism as described herein can be used to identify what IP addresses or routes should be accessible between the two networks and adapt the BGP routes through eBGP to implement this policy.

Autonomous System. The autonomous system (AS) numbers used by the originating and serving networks may be incompatible. An adaptation mechanism as described herein can be used to identify the incompatibility and translate the required AS number of the originating network to an AS number acceptable to the serving network. An adaptation mechanism as described herein can also be used to identify the incompatibility in the opposite direction and translate the required AS number of the serving network to an AS number acceptable to the originating network.

Autonomous System Transit Policy. Some customer VPNs or foreign networks may require communications from the foreign network interface to transit across a customer VPN to a second interface of a foreign network, where both foreign network interfaces identify the foreign network with the same AS number. The configuration of the foreign network, at one or both end and the customer VPN may be incompatible with this requirement. An adaptation mechanism as described herein can be used to identify the incompatibility and translate the required AS number of the foreign network at one or both ends to an AS number acceptable to the customer VPN network, so as to allow transit of communication across a customer VPN between two instances of a foreign network with the same AS number. In this application, the originating and serving networks can be different physical or logical locations of the same foreign network, with adaptation to enable communication across a customer VPN.

Traffic type or application (e.g. VoIP, streaming video, low-latency inter-application transactions, customer-impacting transactions, back-office transactions, Internet web browsing or high volume file transfer). Different types of traffic or applications may have different tolerance for dropped packets and delay and may require different amounts of bandwidth or cost profiles and hence different traffic management policy requirements. In instances where the DSCP field cannot be used by the application, when the DSCP field cannot adequately convey the totality of the application traffic management policy or when the implementation of the desired traffic management policy differs between the originating network and the destination network, an incompatibility exists that prevents flow of traffic with desired traffic management policy. This incompatibility may result in poor application performance or increased costs. An adaptation mechanism as described herein can be used to identify the incompatibility within the intermediating network by examining traffic characteristics and/or customer policy instructions. The intermediating network may then translate the traffic management policies of the originating network to traffic management policies on the serving network, and vice versa whereby it enables compatibility of the traffic management policies on the originating network for that application with the traffic management policies of the serving network for that application.

Service Level requirements (e.g. dropped packet tolerance, delayed packet tolerance, disconnection (lost reachability) tolerance). Different customers may require a service level for all of their traffic or for different types of traffic or applications. For customer service level requirements by traffic type, application or location, and where the service level policy differs between the originating network and the destination network, an incompatibility exists that prevents flow of traffic with the required Service Level policy. This incompatibility may result in poor application performance, increased costs or failure to provide service. An adaptation mechanism as described herein can be used to identify the incompatibility within the intermediating network by examining traffic characteristics and/or customer policy instructions. The intermediating network may then adapt or translate the service level policies of the originating network to service level policies on the serving network and vice versa whereby it enables compatibility of the service level policies on the originating network for that traffic type, application or location with the service level policies on the serving network for that traffic type, application and at the same or different locations.

Bandwidth requirement. Different customers may require different bandwidth and different numbers of connections (as redundancy during network function failure events) for different types of traffic or applications or for different locations. For customer bandwidth requirements by traffic type, application or location, and where the bandwidth available differs between the originating network and the destination network, an incompatibility exists that prevents flow of traffic with the required bandwidth available for communication. This incompatibility may result in poor application performance, increased costs or failure to provide service. An adaptation mechanism as described herein can be used to identify the incompatibility within the intermediating network by examining traffic characteristics and/or customer policy instructions. The intermediating network may then adapt or translate the bandwidth available on the originating network to bandwidth available on the serving network and vice versa whereby it enables compatibility of the bandwidth available for communication on the originating network for that traffic type, application or location with the bandwidth available on the serving network for that traffic type, application and the same or different locations.

Route Table Propagation. A customer may require security policies whereby network addresses and routes available on their private VPN or on the foreign network are filtered or limited to prevent some addresses on an originating network from being able to reach addresses on the serving network and/or to prevent some addresses on a serving network from being able to reach addresses on the originating network. The capability for addresses on an originating network to communicate with addresses on a serving network when that communication is unwanted is a security policy incompatibility. This security policy incompatibility arises because a customer cannot connect a private VPN to a foreign network if unwanted communication between addresses can occur. This incompatibility may result in addresses on the originating network being unable to communicate with cloud service resources (addresses) on the serving network, or vise versa. This incompatibility could also enable addresses on the originating network being able to communicate with cloud service resources (addresses) on the serving network when such communication is unwanted, or vise versa. An adaptation mechanism as described herein can be used to identify the incompatibility within the intermediating network by examining BGP route tables, traffic characteristics and/or customer security policy instructions. The intermediating network may then adapt or withhold the routes available on the customer VPN to addresses that are specified by customer security policy not to be reached from the foreign network to prevent the undesired communication with addresses on the customer VPN. The intermediating network may then also adapt or withhold (delete) the routes to addresses available on the foreign network that are specified by the customer security policy as not to be reached from the customer VPN to prevent the undesired communication with addresses on the foreign network. This mechanism may be applied selectively or wholesale. In the selective case, some addresses on a customer VPN are specified by customer policy as forbidden from being reached from some addresses on the foreign VPN, and vice versa. In the wholesale case, all customer security policy forbidden addresses on a customer VPN are prevented from being reached from all addresses on a foreign VPN, and vice versa. Both selective and wholesale mechanisms for withholding routes to addresses for the customer VPN or foreign network may be applied by the intermediating network at the same time as separate adaptations.

Customers may have more than one cloud computing partners, including partners that compete with each other, to leverage in selecting options to address their business need. The adaptation mechanisms described herein allow customers to avoid unnecessarily limiting their choices by partner constraints that can be avoided by the service provider adapting the network. Similarly, partners may have more than one customer that they can sell to, including both small and large customers shared in common with the service provider. The adaptation mechanism allows the customers with significant route load to establish relationships with partners who would otherwise be incompatible. As noted, this maximizes the value of the service provider's ecosystem and the network traffic that will be generated by the ecosystem. The features described herein can also be leveraged as a third party service providing computing and communications functions.

Thus, as described herein a virtual private network provider can use virtual private network infrastructure, e.g., as shown in FIG. 7, to adapt the virtual private network to provide compatibility between a customer's private network and a foreign network. In this way, communications can be dynamically adapted by, e.g., virtualizing an address for acceptance by a recipient, by "unvirtualizing" an address for communications back to a sender, or by otherwise adapting communications for acceptance by counterparties.

When communications are dynamically adapted by, e.g., virtualizing an address for acceptance by a recipient, by "unvirtualizing" an address for communications back to a sender, or by otherwise adapting communications for acceptance by counterparties, the true originating and destination characteristics within the customer network are obscured from observers in the foreign network. This creates separation of security zones between the customer network and the foreign network, between which transformation policies can be implemented by the intermediating network provider on behalf of the customer while permitting communication between addresses on each network.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards such as MPLS represent examples of the state of the art. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, a network interface controller may be used as a network interface device 140. A network interface device can perform transformations at the instruction of a computer system, which enables greater scale and throughput for the computer system. Examples of operations that can be performed by a network interface device include terminating encrypted tunnels, fragmenting large Layer 4 communications buffers into Layer 3 packets, and acknowledging received packets.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In accordance with an aspect of the present disclosure, a method of adapting an intermediating network to intermediate between an originating network and a servicing network includes identifying a first set of communications addresses in the originating network that can be used to originate communications to the servicing network, and identifying a second set of communications addresses in the servicing network that can be used to service communications originating in the originating network. Characteristics of the end-points represented by the first set of communications addresses and the second set of communications addresses are analyzed. Based on the analyzing, incompatibilities between the first set of communications addresses and the second set of communications addresses that would prevent a communication from one of the first set of communications addresses from reaching the second set of communications addresses are determined. A processor of a computer is used to adapt the intermediating network so that the communication from the first set of communications addresses can be sent to the second set of communications addresses via the intermediating network. The communication from the originating network at the intermediating network is received and routed through the intermediating network to the servicing network.

In accordance with another aspect of the present disclosure, the method also includes virtualizing the first set of communications addresses in the intermediating network so that the first set of communications addresses are assigned to new virtual addresses in the intermediating network, and so that the communication to the serving network appears to the serving network to originate from the virtualized address in the intermediating network.

In accordance with still another aspect of the present disclosure, the servicing network is a cloud computing network provided by a cloud computing provider.

In accordance with yet another aspect of the present disclosure, the originating network is a private network implemented by a customer of a provider of the intermediating network. In accordance with yet another aspect of the present disclosure, the foreign network is a private network implemented by a customer of a provider of the intermediating network.

In accordance with another aspect of the present disclosure, the method also includes the intermediating network is provided by a virtual private network service provider that provides a virtual private network for a customer and that intermediates between the originating network and the servicing network.

In accordance with still another aspect of the present disclosure, the first set of communications addresses and the second set of communications addresses are internet protocol addresses.

In accordance with yet another aspect of the present disclosure, the analyzing includes determining a first number of communications addresses in the first set of communications addresses and a second number of communications addresses in the second set of communications addresses.

In accordance with another aspect of the present disclosure, the analyzing further includes comparing the first number of communications addresses against a threshold set for a provider of the servicing network based on an available number of communications addresses that can be processed in the servicing network.

In accordance with still another aspect of the present disclosure, the incompatibility is based on the number of routes within the originating network and the number of routes within the originating network that can be processed by the servicing network.

In accordance with yet another aspect of the present disclosure, the incompatibility is based on private network addresses used in the originating network.

In accordance with another aspect of the present disclosure, the incompatibility is based on differences in internet protocol versions used in the servicing network and the originating network.

In accordance with still another aspect of the present disclosure, the incompatibility is based on a security mechanism used in the originating network or the servicing network.

In accordance with yet another aspect of the present disclosure, the security mechanism is a firewall.

In accordance with another aspect of the present disclosure, the incompatibility is based on usage constraints imposed by the customer or the provider of the originating network or the intermediating network.

In accordance with still another aspect of the present disclosure, the incompatibility is based on packet sizes used in the originating network. In accordance with still another aspect of the present disclosure, the incompatibility is based on network applications used in the originating network (e.g. WAN Acceleration compression and content caching). In accordance with still another aspect of the present disclosure, the incompatibility is based on an encrypted communications tunnel (e.g. IPSec, SSL/TLS or GRE) terminated in the customer network and/or the foreign network.

In accordance with another aspect of the present disclosure, the adapting includes assigning new virtual communications addresses to the first set of communications addresses in the intermediating network, and translating the first set of communications addresses to the new virtual communications addresses for communications routed from the originating network by the intermediating network.

In accordance with still another aspect of the present disclosure, the adapting further includes translating the new virtual communications addresses to the first set of communications addresses for communications routed to the originating network by the intermediating network.

In accordance with an aspect of the present disclosure, a tangible computer readable storage medium stores a computer program. The computer program, when executed by a processor, causes a computer apparatus to perform a process that includes identifying a first set of communications addresses in the originating network that can be used to originate communications to the servicing network. A second set of communications addresses in the servicing network that can be used to service communications originating in the originating network are also identified. The first set of communications addresses and the second set of communications addresses are analyzed. Based on the analyzing, incompatibilities between the first set of communications addresses and the second set of communications addresses that would prevent a communication from one of the first set of communications addresses from reaching the second set of communications addresses are determined. The intermediating network is adapted so that the communication from the first set of communications addresses can be sent to the second set of communications addresses via the intermediating network. The communication from the originating network is received at the intermediating network and routed through the intermediating network to the servicing network.

A computer apparatus includes a memory that stores instructions and a processor that executes the instructions. When executed by the processor, the instructions cause the processor to perform operations including identifying a first set of communications addresses in the originating network that can be used to originate communications to the servicing network, and identifying a second set of communications addresses in the servicing network that can be used to service communications originating in the originating network. The first set of communications addresses and the second set of communications addresses are analyzed. Based on the analyzing, incompatibilities between the first set of communications addresses and the second set of communications addresses that would prevent a communication from one of the first set of communications addresses from reaching the second set of communications addresses are determined. A processor of a computer is used to adapt the intermediating network so that the communication from the first set of communications addresses can be sent to the second set of communications addresses via the intermediating network. The communication from the originating network is received at the intermediating network and routed through the intermediating network to the servicing network.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of adapting an intermediating network to intermediate between an originating network and a servicing network, the method comprising:
    identifying a first set of communications addresses in the originating network that can be used to originate communications to the servicing network;
    identifying a second set of communications addresses in the servicing network that can be used to service communications originating in the originating network;
    analyzing characteristics of the first set of communications addresses and the second set of communications addresses;
    determining, based on the analyzing, an incompatibility between the first set of communications addresses and the second set of communications addresses that would prevent a communication from one of the first set of communications addresses from reaching the second set of communications addresses, the incompatibility including a number of communications addresses in the first set of communications addresses exceeding a tolerance of the servicing network;
    adapting, using a processor of a computer, the intermediating network so that the communication from the one of the first set of communications addresses can be sent to the second set of communications addresses via the intermediating network when the tolerance of the servicing network is exceeded, the adapting including grouping a plurality of communications addresses of the first set of communications addresses to a single waypoint, the single waypoint being a virtual address for the plurality of communications addresses of the first set of communications addresses; and
    receiving a communication from the originating network, from one of the plurality of communication addresses of the first set of communications addresses, at the intermediating network and routing the communication through the intermediating network to the servicing network via the single waypoint,
    wherein, via the single waypoint, the plurality of communication addresses of the first set of communications addresses is obscured to the servicing network for allowing the number of communications addresses in the first set of communications addresses to exceed the tolerance of the servicing network.

2. The method of claim 1, further comprising:
    virtualizing the first set of communications addresses in the intermediating network so that the first set of communications addresses are assigned to new virtual addresses in the intermediating network, and so that the communications to the servicing network appear to the servicing network to originate from the new virtual addresses in the intermediating network.

3. The method of claim 1,
    wherein the servicing network is a cloud computing network provided by a cloud computing provider.

4. The method of claim 1,
    wherein the originating network is a private network implemented by a customer of a provider of the intermediating network or a private network implemented by a customer of the servicing network.

5. The method of claim 1,
    wherein the intermediating network is provided by a virtual private network service provider that provides a virtual private network for a customer and that intermediates between the originating network and the servicing network.

6. The method of claim 1,
    wherein the first set of communications addresses and the second set of communications addresses are internet protocol addresses.

7. The method of claim 1,
    wherein the analyzing comprises determining the number of communications addresses in the first set of communications addresses and a second number of communications addresses in the second set of communications addresses.

8. The method of claim 7,
    wherein the analyzing further comprises comparing the number of communications addresses in the first set of communications addresses against a threshold set for a provider of the servicing network based on an available number of communications addresses that can be processed in the servicing network.

9. The method of claim 8,
    wherein the incompatibility is based on a number of routes within the originating network and a number of routes within the originating network that can be processed by the servicing network.

10. The method of claim 1,
    wherein the incompatibility is based on private network addresses used in the originating network or in the servicing network.

11. The method of claim 1,
    wherein the incompatibility is further based on differences in internet protocol versions used in the servicing network and the originating network.

12. The method of claim 1,
    wherein the incompatibility is further based on a security mechanism used in the originating network.

13. The method of claim 12,
    wherein the security mechanism comprises a firewall.

14. The method of claim 1,
    wherein the incompatibility is based on usage constraints imposed by the provider of the originating network on the intermediating network.

15. The method of claim 14,
    wherein the usage constraints are costs for bandwidth.

16. The method of claim 1,
    wherein the incompatibility is based on packet sizes used in the originating network.

17. The method of claim 1,
    wherein the adapting comprises assigning new virtual communications addresses to the first set of communications addresses in the intermediating network, and translating the first set of communications addresses to the new virtual communications addresses for communications routed from the originating network by the intermediating network.

18. The method of claim 17,
    wherein the adapting further comprises translating the new virtual communications addresses to the first set of communications addresses for communications routed to the originating network by the intermediating network.

19. A non-transitory computer readable storage medium that stores a computer program, the computer program, when executed by a processor, causing a computer apparatus to perform a process comprising:

identifying a first set of communications addresses in the originating network that can be used to originate communications to the servicing network;

identifying a second set of communications addresses in the servicing network that can be used to service communications originating in the originating network;

analyzing characteristics of the first set of communications addresses and the second set of communications addresses;

determining, based on the analyzing, an incompatibility between the first set of communications addresses and the second set of communications addresses that would prevent a communication from one of the first set of communications addresses from reaching the second set of communications addresses, the incompatibility including a number of communications addresses in the first set of communications addresses exceeding a tolerance of the servicing network;

adapting the intermediating network so that the communication from the one of the first set of communications addresses can be sent to the second set of communications addresses via the intermediating network when the tolerance of the servicing network is exceeded, the adapting including grouping a plurality of communications addresses of the first set of communications addresses to a single waypoint, the single waypoint being a virtual address for the plurality of communications addresses of the first set of communications addresses; and receiving a communication from the originating network, from one of the plurality of communication addresses of the first set of communications addresses, at the intermediating network and routing the communication through the intermediating network to the servicing network via the single waypoint, wherein, via the single waypoint, the plurality of communication addresses of the first set of communications addresses is obscured to the servicing network for allowing the number of communications addresses in the first set of communications addresses to exceed the tolerance of the servicing network.

20. A computer apparatus, comprising:
a memory that stores instructions, and
a processor that executes the instructions,
wherein, when executed by the processor, the instructions cause the processor to perform operations comprising:

identifying a first set of communications addresses in the originating network that can be used to originate communications to the servicing network;

identifying a second set of communications addresses in the servicing network that can be used to service communications originating in the originating network;

analyzing characteristics of the first set of communications addresses and the second set of communications addresses;

determining, based on the analyzing, an incompatibility between the first set of communications addresses and the second set of communications addresses that would prevent a communication from one of the first set of communications addresses from reaching the second set of communications addresses, the incompatibility including a number of communications addresses in the first set of communications addresses exceeding a tolerance of the servicing network;

adapting the intermediating network so that the communication from the one of the first set of communications addresses can be sent to the second set of communications addresses via the intermediating network when the tolerance of the servicing network is exceeded, the adapting including grouping a plurality of communications addresses of the first set of communications addresses to a single waypoint, the single waypoint being a virtual address for the plurality of communications addresses of the first set of communications addresses; and receiving a communication from the originating network, from one of the plurality of communication addresses of the first set of communications addresses, at the intermediating network and routing the communication through the intermediating network to the servicing network via the single waypoint, wherein, via the single waypoint, the plurality of communication addresses of the first set of communications addresses is obscured to the servicing network for allowing the number of communications addresses in the first set of communications addresses to exceed the tolerance of the servicing network.

* * * * *

UNITED STATES PATENT AND TRADEMARK OFFICE
CERTIFICATE OF CORRECTION

PATENT NO. : 9,986,019 B2
APPLICATION NO. : 14/749085
DATED : May 29, 2018
INVENTOR(S) : J. Mulligan et al.

It is certified that error appears in the above-identified patent and that said Letters Patent is hereby corrected as shown below:

In the Claims

Column 23, Line 46 (Claim 1, Line 34) please change "communication addresses" to --communications addresses--

Column 23, Lines 51-52 (Claim 1, Lines 39-40) please change "communication addresses" to --communications addresses--

Column 25, Line 38 (Claim 19, Line 35) please change "communication addresses" to --communications addresses--

Column 25, Lines 43-44 (Claim 19, Lines 40-41) please change "communication addresses" to --communications addresses--

Column 26, Lines 38-39 (Claim 20, Lines 38-39) please change "communication addresses" to --communications addresses--

Column 26, Lines 44-45 (Claim 20, Lines 44-45) please change "communication addresses" to --communications addresses--

Signed and Sealed this
Twenty-fifth Day of December, 2018

Andrei Iancu
*Director of the United States Patent and Trademark Office*